DATA TRANSLATOR EMPLOYING DISPLACEABLE DATA CARDS

Filed May 15, 1950 3 Sheets-Sheet 1

INVENTOR.

Judson O'D. Shepherd

DATA TRANSLATOR EMPLOYING DISPLACEABLE DATA CARDS

Filed May 15, 1950

3 Sheets-Sheet 2

INVENTOR

John O'D. Shepherd

Aug. 5, 1952 J. O'D. SHEPHERD 2,605,965

DATA TRANSLATOR EMPLOYING DISPLACEABLE DATA CARDS

Filed May 15, 1950 3 Sheets-Sheet 3

INVENTOR.

Patented Aug. 5, 1952 2,605,965

UNITED STATES PATENT OFFICE 2,605,965

DATA TRANSLATOR EMPLOYING DISPLACEABLE DATA CARDS

Judson O'D. Shepherd, Atlanta, Ga.

Application May 15, 1950, Serial No. 161,968

24 Claims. (Cl. 235—61.6)

This invention relates to translation devices and particularly to devices of this class which employ sensible data cards which may be selected and sensed to disclose the information which they contain.

Translation, in its broad aspects here considered, involves the conversion of primary data information into secondary information for control or other purposes. Such arrangements of various type are extensively employed in the dial telephone art. An example is in the establishment of connections in a large metropolitan dial system, in which a called telephone office may be designated by codes in the form of ABX, in which "AB" represents the first two letters of an office name and "X" any digit from 1 to 0. This office code is dialed, followed by the four numerical digits of the wanted number in the desired office, but this invention is primarily concerned in the 3-digit office code.

This code is registered and then converted, or translated, into a plurality of information items necessary for the setting up of a connection through the dial switches to a trunk outgoing to the desired office in which the called number is located. The routing to the distant office may be through a tandem and this fact is disclosed through translation or decoding means as information items for control purposes to effect the switching through the tandem. Other information items may be required for proper control of the various switching operations and type of pulsing or control to complete the connection of the distant office, and to effect transmission controls in some instances. The three digits designating the called office may be translated into a large number of information items individual thereto. An office code of, say, AB2 (which represents digits 222) will require certain information items, whereas AB3 (code 223) may require an altogether different set of information items, and which may be more or less than required for code 222. This translation, as now prevails, may generally be considered as a process of reducing the 3-digit decimal code to a "code point" individual to that code and then expanding the "code point" into the several required control items of information.

One of the numerous systems for effecting translation of this type involves the use of "point" cards, each of which is individual to a 3-digit decimal office code, or area code for nation-wide toll dialing. Such cards are individually selectable in response to the registering of its code and each contains, as punchings therein, the information items into which the office code is translated. A selected card is scanned by light which passes through the punched holes to effect energization of photo-responsive elements which, in turn, operate relays for registering the information of the translation. It is the practice to have a box-like file of such selectable cards common to a plurality of registering circuits, markers or other control elements, since the selection and scanning of a card requires only a fraction of a second. It is to this general class of card translating devices that the present invention relates.

It was pointed out above that a separate card is now required for each code to be translated. A feature of the present invention is the employment of point cards, each of which may carry a plurality of separately selectable translations. As an example of the general intent, there are theoretically 640 office codes which may be dialed by using letters which appear in holes two through nine of a conventional telephone dial followed by one of ten digits. This would normally require 640 point cards. In accordance with the present invention, 64 data cards may be employed corresponding preferably to the 64 theoretical combinations for the "AB" portion of the code using letters in the office designation. Each such card will carry ten different translations corresponding to the ten digits "X" of the "ABX" code. Ten additional digit cards are contemplated, each corresponding to one of the "X" digits, one through ten. By selecting one of the 64 point cards and one of the ten digit cards, any one of 640 separate code translations may be effected since the ten digit cards are used to control which one of the ten translations on a selected data card is effective.

The principle of employing upwards of 64 data cards with ten digit cards is particularly applicable to the expansion of metropolitan areas in which the numbering plan is of the type AB–XXXX, which is theoretically limited to 64 central offices, into the ABX–XXXX type, with a theoretical limit of 640 offices, as mentioned. Such offices now have translation arrangements for the smaller number of offices, and such means may be employed to select any one of 64 point cards which may be provided in accordance with the present invention. The "X" of the office code, which is to be added for the area expansion, may be registered in a sender or equivalent of the system to select and operate the digit card of the translator to provide for a total of 640 translations. Such means of area expansion may be much more economical than other means now employed requiring extensive equipment replacements and/or modifications.

It is another feature of the invention that the photo-responsive elements excited by scanning of the selected cards are used commonly for all ten of the translations carried by each of the data cards. That is, there are required only as many information photo-cells, or the like, as there are different information designating punches for any one of the ten translations on a data card, and not a separate photo-cell for each possible information punching in a data card, which indicates in the order of one-tenth as many photo-responsive elements as otherwise would be needed in the primary embodiment of this invention.

It is another feature of the invention that for 2-digit translation, it is not necessary to provide means effective from the point registration of said two digits to select a data card, since it is disclosed that the first registered digit may select one card and the second digit may select a corresponding second card, so that the jointly selected cards will provide the translated data for the combined two digits. This principle may be employed for translating more than two registered digits without first converting those digits into a point code, or the like, by selecting a separate card corresponding to each digit and effecting translation in response to the several cards jointly selected.

It is still a further feature of the invention that it is not necessary to code a registered digit for the selection of a card corresponding thereto, as is required with other known systems.

Another feature of the invention is the checking of the operation of the card selecting, displacing and restoring arrangements, and the propriety of the codes by which the cards are selected.

Inasmuch as this invention is applicable to other uses than for dial telephone translations, it will be described primarily in connection with computing systems since such description may be somewhat simpler and the invention is well suited to such systems.

Before describing the invention it may be appropriate to set out some of the nomenclature used and the coding of information as preferably employed. The cards coresponding generally to the "point" cards mentioned above will be referred to as "data" cards, while those generally corresponding to "digit" cards will be referred to hereafter as the "block" cards, which are descriptive of their functions.

The code generally used will be the familiar "two out of five" type, in which selections and data transmission will comprise circuit closures and related operations of two out of five conditions in an additive code arrangement. The code comprises representations corresponding to values of 0, 1, 2, 4 and 7, taken two at a time to add to the value of the digit which they represent, except digit "0" is represented by codes 4 and 7.

This code is as follows:

| Digit | Code Combination | Digit | Code Combination |
|---|---|---|---|
| 1 | 0+1 | 6 | 2+4 |
| 2 | 0+2 | 7 | 0+7 |
| 3 | 1+2 | 8 | 1+7 |
| 4 | 0+4 | 9 | 2+7 |
| 5 | 1+4 | 0 | 4+7 |

Throughout the specification and drawings the designations "0," "1," "2," "4" and "7" will commonly be used to identify elements relating to the code, and are not reference characters.

"Code bars" are certain bars under the cards, which are preferably arranged in a horizontal stack, employed to select a card dependent upon the combination of certain of said bars which are actuated in accordance with the above code. "Tabs" refer to projections at the bottom of the cards arranged to cooperate with the code bars for card selection. "Punchings" are holes which are made in the various cards.

This invention is set out by three sheets of drawings comprising six figures as follows.

Figures 1, 2, 3:
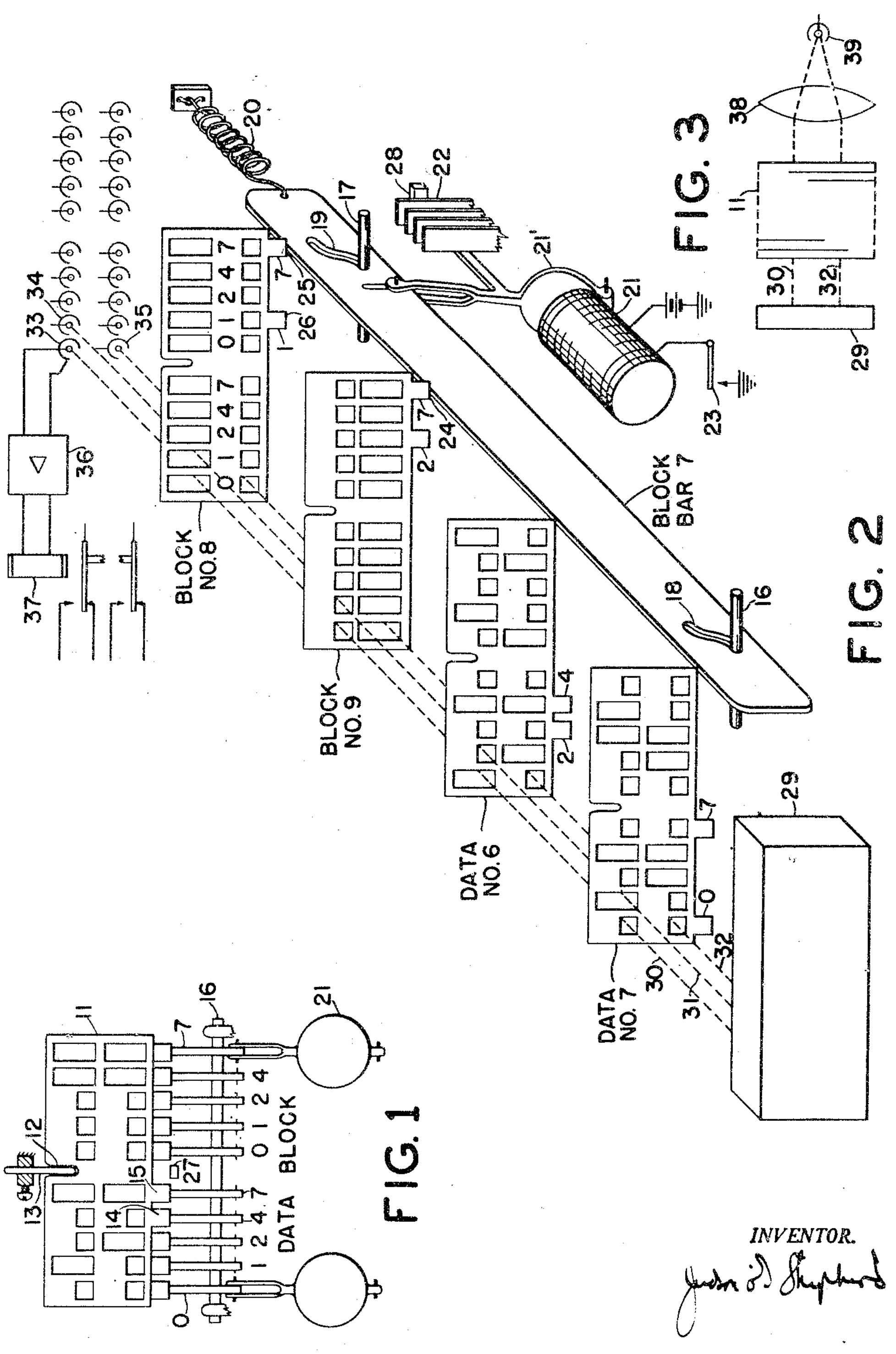
Fig. 1 shows the front view of an assembly, or stack, of cards with associated code bars and illustrative operating magnets therefor.
Fig. 2 is an expanded view of a card assembly showing two data cards and two block cards, with a code bar and operating magnets therefor to illustrate the principles involved.
Fig. 3 is a partial side view of a stack of cards showing means to employ a single photo-cell for a plurality of translation items.

Fig. 1 indicates the front view of a stack of cards 11, with the supporting framework and the like omitted. For this disclosure of principles, it is contemplated that there will be ten data cards and two blocking cards, of which the tenth data card is at the front of the stack, and the blocking cards are in the back, although, as will be understood from the selecting principle involved, it is immaterial as to the arrangement of any of the cards in the stack and they may be randomly located therein. There are five data and five block code bars functionally designated in accordance with their code elements. All of the block code bars are shown, although only those for code elements 1, 2 and 7 are used in this simplified, illustrative embodiment. The cards are slotted at 12, and extending into this slot is a guide member 13 which is adjustably mounted so that it may be withdrawn from the stack to permit the removal of a card by sliding it to the side. In practicing this invention, the slot and guide member may be arranged off-center of the cards as one of several apparent means which may be employed to prevent a card being placed backwards in the stack without detection.

The first card shown in the stack, which corresponds to data card No. 10, has two tabs 14 and 15 resting on data code bars 4 and 7, respectively, extending under the stack. The code bars are slideably mounted between suitable guides, not shown, to maintain them in vertical position and proper alignment, and upon rods 16 and 17, which are better shown by Fig. 2. The latter figure illustrates the code bar arrangement as exemplified by block bar 7. This bar has cam slots 18 and 19 cooperating respectively with rods 16 and 17, and is tensioned to the right by spring 20. This bar has an operating magnet or solenoid 21 with its armature 21′ suitably hinged or linked to the bar. Energization of this magnet by a suitable circuit, including selectively operable circuit closing means illustrated by contacts 23, will result in its bar being slid to the left in Fig. 2 and, due to the shape of slots 18 and 19, the bar will be pulled down or drop, as it will be referred to. It will be noted that block cards Nos. 8 and 9 have tabs 24 and 25, respectively, resting on block bar 7, so when the latter bar drops, support of these two block cards by said tabs will be removed. If, coincident with block bar 7 dropping, the corresponding bar (not shown) under tab 26 also drops, support of block card No. 8 will be removed and it will drop, being stopped by virtue of the card resting on the code bars which have remained in their normal position, or by a special stop bar 27 (Fig. 1) extending under the stack. When magnet 21 is deenergized, spring 20 retracts its bar to result in block card No. 8 being restored to normal, if it was the one which had dropped. It is to be understood that there will be a magnet such as 21, with its associated contacts, for each of the code bars.

Each magnet 21 has associated with it a suitable arrangement of contacts 22 which are closed upon operation of the magnet by virtue of armature extension 28. These contacts of the block magnets, which are actuated as the armatures complete their strokes and the associated bars complete their dropping movement, are connected in a circuit of familiar type to assure that two, and only two, such magnets for the block code are operated, which is a feature of the two-out-of-five code to assure accuracy of operations. By such familiar circuit if only one, or more than two, block code bars operate, a faulty operation is indicated and an alarm may be sounded, or other operations effected. Similar arrangements are provided for the data code bars. Such arrangements subsequently will be described in connection with Fig. 6.

Further to illustrate the card selection, the front card of Fig. 1 has, as stated, tabs 14 and 15 resting on data code bars 4 and 7, and no other tabs. If data bars 4 and 7 drop for code No. 10, this No. 10 card also will drop. Both bars 4 and 7 drop only for code No. 10, so it will be seen that, for any other code, this card will remain in its normal position. The remainder of the ten data cards have two tabs for their data code number and it will be recognized, therefore, that one and only one data card will drop for any of the ten paired data code bar operations. It is to be understood that the data cards have no tabs for the block code bars, and the block cards have no tabs for data code bars. In the described fashion, a single data card and a single block card may be dropped for an individual translation to be effected by operation of a pair of code bars in the data group and a pair in the block group.

Again with reference to Fig. 2, a source of light 29 projects a beam of parallel rays on the card stack so that it may pass through normal punchings in the cards thereof and fall on a bank of photo-responsive elements. This light may be considered as being a plurality of parallel beams such as 30, 31 and 32, each of area corresponding to the smaller or normal punchings in the cards, which are directed through punchings in the card stack to photocells 33, 34 and 35, respectively. Each of these cells is connected to an amplifier; for example, cell 33 is connected to amplifier 36, which in turn is connected to suitable responsive means, here illustrated as relay 37. With cell 33 excited, relay 37 will be operated, although well known electronic control means can be employed to cause relay 37 to be released upon excitation of cell 33. Relay 37 has a suitable contact arrangement to effect appropriate control operations either separately or in conjunction with the operation of other relays similar to 37. While it may be considered that there are individual beams such as 30, 31 and 32 projected by source 29, it will be understood that a single beam of parallel rays may be directed at the card stack, and suitable lens arrangements may be employed to assure that the rays will be parallel so that with the cards of the stack in normal position light will pass through all normal and enlarged punchings to reach the photo-cells.

The illustrative translating arrangement disclosed by Figs. 1 and 2 provides for the multiplication of any digit from one to ten by either digit eight or nine, and the translation result is the product of such digits. Fig. 2 is restricted, for illustrative purposes, to data cards Nos. 6 and 7, and block cards Nos. 8 and 9. Let it be assumed that it is desired to determine the product (translation) of seven by nine. Data card No. 7 and block card No. 9 are dropped by proper operation of their respective code bar combinations. With data card No. 7 dropped, it will be seen that, due to the coded punch pattern of holes which are in two rows, illustrative rays 30 and 32 will be cut off by normal punchings of card No. 7, but illustrative ray 31 will pass through this card since the punching for it is vertically elongated. Since card No. 7 provides for either the product of seven times eight (56) or seven times nine (63), its upper row of punchings are elongated in accordance with the above set out code to permit light to pass through for the number (product) 56 and the lower row for the number 63. As a result of dropping of the No. 7 card alone, the upper row of photo-cells will be excited for the code (product) "56" and the lower row for code "63." But since blocking card No. 9 has also been dropped, it will be seen that the several beams which may pass through the upper row of punchings of data card No. 7 are blocked by the upper portion of block card No. 9, since the normal punchings of this row drop out of the line of the upper beams. But due to the elongated holes of the lower row of block card No. 9, light may also pass through this card which had also passed through the elongated holes of the lower row of data card No. 7, i. e., product code "63." This will result in the operation of a combination of relays such as 37 to provide information representing "63."

It likewise will be seen that had block card No. 8 been dropped instead of No. 9, light which passes through the upper row of holes of card No. 7 will remain unblocked and product code "56" will pass to the photo-cells and thereby operate their respective relays. In a similar fashion, dropping of cards No. 6 and 9 will result in the lower row of holes of the former to be effective to result in indication of product (translation) code "54," and had cards Nos. 6 and 8 been dropped, the upper row of holes of the former would be effective to result in translation code "48."

It is contemplated that the contacts of relays such as 37, which will operated in this embodiment in two sets of pairs, one for the tens and the other for the units of the translation, may be wired so as to decode the product by known means to result in the illumination of lamps to indicate that product. It is further contemplated that the operated condition of relays such as 37 may be transferred to a dial office sender, a marker, a computing machine or other appropriate device to use the translated information. It is still further contemplated that excitation battery, or the equivalent, may be withheld from the photo-cells until two and only two code bars for the data code and two and only two for the block code have been operated, and circuit arrangements including contacts such as 22 associated with each code bar may be employed for this purpose, as will be described.

It will be seen that for any translation only one row, either the upper or the lower one, of photo-cells is employed. It consequently is unnecessary to have but a single such row as shown by Fig. 3. The light source 29 projects two sets of beams such as 30 for one of the sets of holes in the upper row and 32 for a set in the lower row of card stack 11. A converging lens 38 extends across the stack and is designed to focus the beams from either row of holes which may be effective for a translation to a single row of photo-cells such as 39. There will be one such cell for each vertical file of data punchings. The arrangement of Fig. 2 indicates 20 photo-cells, 20 amplifiers and 20 relays such as 37, whereas only ten of these components are used to effect the same results in accordance with Fig. 3. It will, of course, be feasible to use 20 photo-cells with the pair in each vertical file wired to an amplifier common to that pair, which would reduce the amplifiers such as 36 and relays such as 37 to ten in this illustrative device.

The essential principle set out above and shown by Figs. 1, 2 and 3 will now be expanded. First, the problem of multiplying any two single digits together to provide the product (translation) will be considered further. This will require ten data cards and ten blocking cards, or a total of twenty, with the cards of each class corresponding to digits one to ten. Each of the data cards will have ten horizontal rows of punchings of ten punchings to the row similar to the two rows as shown for such cards of Figs. 1 and 2. Each row of holes will be punched with the code for the product of its card number multiplied by the number of one of the blocking cards. Data cards Nos. 6 and 7, for example, will be punched for the codes in the several rows, as follows:

| Row | Data Card No. 6 Code Punching | Data Card No. 7 Code Punching |
|---|---|---|
| 1 | 06 | 07 |
| 2 | 12 | 14 |
| 3 | 18 | 21 |
| 4 | 24 | 28 |
| 5 | 30 | 35 |
| 6 | 36 | 42 |
| 7 | 42 | 49 |
| 8 | 48 | 56 |
| 9 | 54 | 63 |
| 10 | 60 | 70 |

Each of the ten block cards will be punched to block out, when it drops, all rows except that corresponding to its own number. Block card No. 9, for example, when dropped, will block all data card rows except row No. 9. Consequently, if data card No. 7 is also dropped, only its ninth row will be effective and the photo-cells will receive the code of "63" for the product (translation), as described above. In similar fashion, any data card and any block card when selectively dropped will result in the code for the product of their numerical representations. This may broadly be considered as 2-digit translation. It is apparent that ten photo-cells and related elements will be sufficient for this arrangement in accordance with the disclosure of Fig. 3, with a lens such as 38 adapted to focus the light which may pass through the vertical files of ten punchings into a single photo-cell such as 39 corresponding to each file.

The above has treated with multiplication, with the product of two single digits as the result of translation, and such translation result being defined by the "two out of five code." The translation results may be of quite different character for appropriate applications of this invention. Continuing with the above 2-digit translation, the two digits may be the telephone office code in numbering plan areas of the AB–XXXX type. The data cards may correspond to the "A" and the block cards to the "B" of such codes, and upon a sender, register, marker or the like receiving these two digits, it may then connect itself momentarily to a card translator of the character described and actuate the code bars to drop the two corresponding cards to result in decoding these two digits to indicate the switches to be operated to reach the trunk to the distant office and other information. The card punchings need not be in accordance with the "two out of five" code, but may be in accordance with any other code or for any of ten direct uncoded information designations corresponding to the ten card punchings in a row. With ten holes in a row, each set of five thereof can provide 31 information representations on the basis of "one or more out of five" code for each of the two sets of five holes of the row. On the basis of "one or more out of four" code, two groups of four holes will provide two sets of information of 15 elements each, with two holes for direct (uncoded) information. It is to be recognized that the card is in no wise limited in principle to only ten data holes in a row. Many more may be provided within the scope of the invention set out.

The cards may be of any suitable substance, but preferably will be magnetic material should I elect to provide a first electromagnet with a pole face or faces of single polarity above and transversing the stack and a similar one below the stack. When a selection is to be made, the upper magnet may be energized to lift the cards from the code bars and, by virtue of a single polarity, the cards will stand apart by magnetic repulsion. The lifting of the cards will remove the load of the card stack from the code bars, enabling them to move freely. When the code bars have operated, the lower magnet may be energized to pull the selected cards down. When scanning is completed, the lower magnet may be deenergized and the upper one reenergized to lift the dropped cards and the remainder of the stack from the code bars, permitting the latter freely to restore. Such arrangements will improve the speed as well as the functioning of the device.

Figs. 1 and 2 indicate that the card tabs rest directly on the code bars, and the latter are longitudinally moved to drop them by virtue of the cam arrangement. Other of the arts, including teletypewriter mechanisms, disclose bail arrangements whereby selections may be made by small magnets and a solenoid or motor driven energy supply provided to effect an operation which has been selected. It is contemplated that such means may be employed as an alternative of the code bar arrangement disclosed. By such means the magnets such as 21 may be employed to effect the selection of a code bar and the code bar itself pulled straight down by means including a solenoid or the like, and similarly restored after translation has been completed. The movement of the code bar straight down will have particular advantage when the above described magnetic lifting arrangements are not provided, since it will reduce wear on the card tabs inasmuch as there will be no sliding contact involved. With small card stacks, the code bars may be held in their normal position by springs and pulled straight down by magnets similar to 21. Suitable guides for the code bars and appropriate linkages between the latter and the magnet armatures will be required.

It will be understood that any suitable arrangement for selecting and dropping, or pulling down, individual cards may be employed within the scope of this invention. While it is indicated that the movement of the cards is downward upon selection, this is a relative term and by suitable arrangements a different direction of shifting them may be employed, which will require the punching design to be consistent therewith. It is also apparent that the data cards may be actuated in one direction, say down, and the block cards may be shifted transversely for their selection. It is further apparent that instead of using code bars which are operated in combinations, a separate code bar may be employed for each card, which will bear a single tab corresponding thereto. For 2-digit translation, ten data card and ten block card bars will be required.

The selection of data cards on the basis of a single digit was likewise used for illustration. It is feasible to make data card selections on the basis of two, or three, or even more digits. One arrangement will provide selection of data cards on a 2-digit basis (100 such cards) and block cards on a single digit basis (10 cards), to provide 3-digit translation. By employing 3-digit selection of data cards (1,000 cards) and block cards on a single digit basis, 4-digit translation may be effected. Ten thousand translations may consequently be provided with an arrangement of 1,010 cards.

Figures 4, 5:
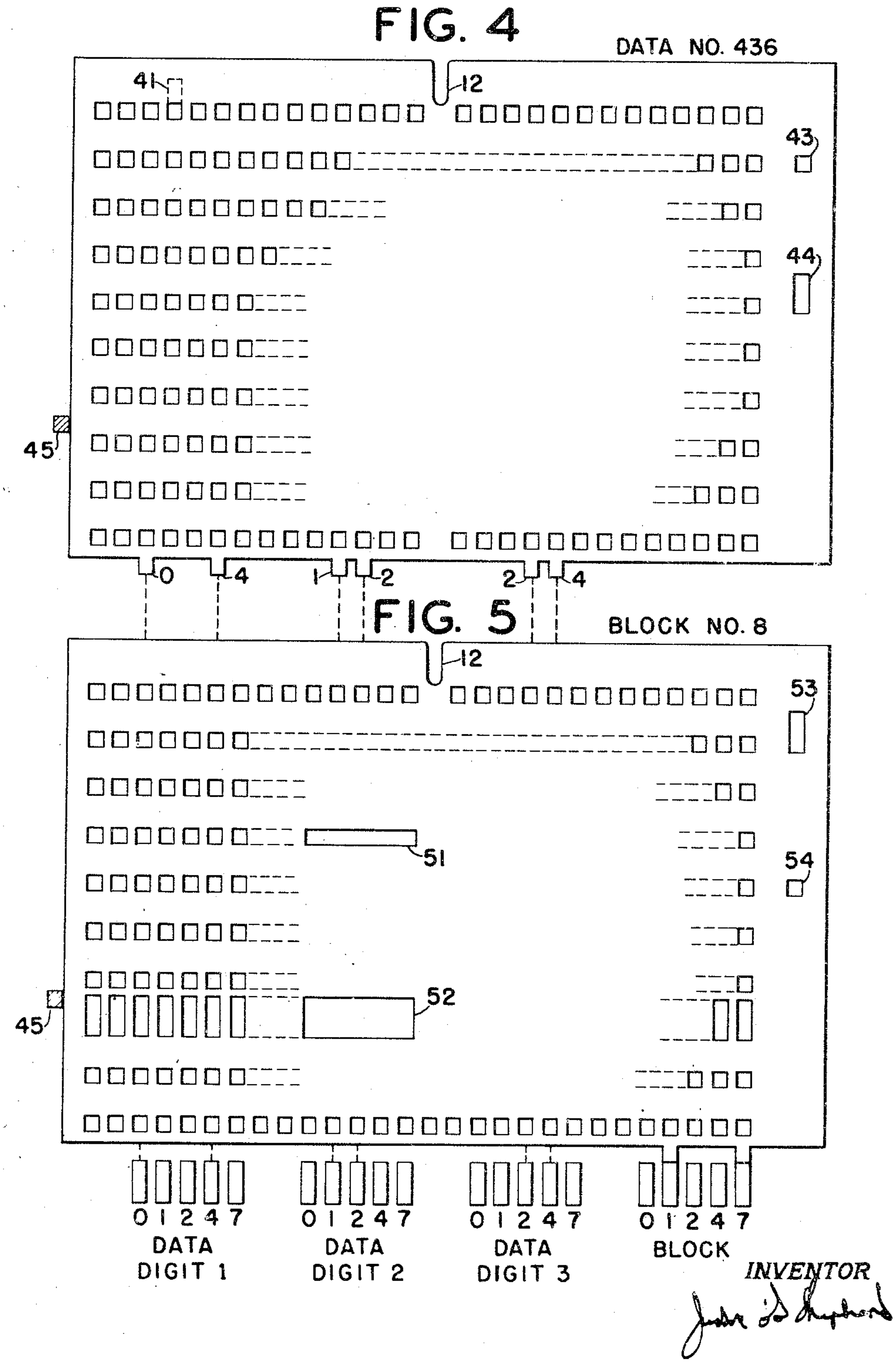
Fig. 4 is a blank data card showing its normal punchings which may be expanded into translation data punchings by vertical enlargement of such normal punchings.
Fig. 5 is an illustrative block card which may be used in conjunction with the data card of Fig. 4.

Fig. 4 shows a data card for 3-digit selection. It has been arbitrarily designated 436, for illustration, and is one of a thousand such cards. In its original state, the card preferably has a complete set of data card selection tabs at its bottom, certain of which may be chipped, cut off or otherwise removed to provide for its selection code, No. 436 in this case. It does not have tabs in the block code bar positions. Fig. 5 shows a companion block card No. 8, likewise chosen merely for illustration. Its tabs have been cut for code No. 8, and it has no tabs in the data code bar positions. The four sets of code bars are shown at the bottom of Fig. 5, and the tabs of the data card of Fig. 4 may be considered in view of the locations of these code bars since the cards of these two figures are drawn in vertical alignment.

It will be seen that card No. 436 will drop only if code bars 0 and 4 of the hundreds digit, bars 1 and 2 of the tens digit and bars 2 and 4 of the units digit have been displaced downward. It is only for this one combination of code bars will card No. 436 drop, since it will be supported by at least one of its tabs on a code bar which is normal for all of the other 999 possible codes of three digits. It is likewise evident that each of the other 999 cards will be supported by at least one of its tabs resting on a code bar in its normal position if card No. 436 is selected. It also will be seen that any one of the ten blocking cards can be dropped by proper corresponding operation of its code bars.

It is contemplated that each data card preferably will be manufactured with its normal holes punched in it, as indicated. By normal holes are meant preferably rectangular holes which will provide for passage of light through the stack in its normal condition. It is to be understood that this card will have ten full rows of normal holes with 27 (for example) holes in each row. The rows may, for reference, be counted, beginning with one, down from the top. The entry of data information on any row may be effected by vertically enlarging a normal hole as indicated by 41.

The block cards preferably will be provided with a full complement of normal holes to match the ten rows of normal holes of the data cards. One row of each of them, however, will be vertically enlarged, as shown by a portion of row No. 8 of card No. 8, which provides for the blocking of all data except that for row No. 8 of the data card which is dropped. While individual normal and unblocking holes are generally shown for the block cards, an alternative of providing slots corresponding to a plurality of normal holes in a row is indicated by 51 of Fig. 5, and likewise a section of the card may be removed as at 52 for the enlarged or unblocking holes of row No. 8.

With obvious expansion of the disclosure of Fig. 2 and employing data and block cards similar to those shown by Figs. 4 and 5, any one of a thousand data cards may be selected and the data of only one row of the ten rows of information holes of the selected card made effective. This provides 10,000 selectable translations by employing 1,010 cards, as mentioned. The example of Fig. 4 shows that 27 information designations may be provided for each of the 10,000 translations and such information may be punched in the cards (by enlarging normal holes, for example) as appropriate for the employment of the device. This number is, of course, arbitrary since a smaller or larger number than 27 may be employed up to the physical limitations brought about by the size of the card and other elements. It is to be understood that the arrangement of Fig. 3, whereby only one photo-cell or the like is required for each vertical file of information designating punchings, is applicable to this illustration of 4-digit translation.

In devices of this character, it is desirable to provide checks of their operation. For example, a stuck card should be promptly detected and an appropriate alarm sounded for an attendant. To effect this, there is provided a hole 43 in each of the data cards in the second row and an elongated hole 53 in each block card at a position corresponding thereto in the second row. Light is normally transmitted through holes 43 of the data cards and 53 of the block cards to maintain a photo-cell excited. Should any data card drop, the beam to the latter cell will be intercepted, which may be employed to indicate a dropped card. Similar holes 54 and 44 in the block and data cards, respectively, are provided, to intercept a beam when a block card drops. In operating this device, when the code bars have been properly actuated, it should result in the beams through holes 43 and 54 being intercepted by dropping a card of each class, and if this does not occur, a stuck card is indicated. Similar holes may be provided on the opposite edge of the cards to assure that a card has not tilted rather than properly dropped. It will be understood that the beams through holes 43 and 54 will fall on photo-cells, or a photo-cell, in accordance with Fig. 3, with amplifying, relay and other appropriate elements and circuits to provide the results set out. The energizing circuit for the latter cells or cell may be arranged to be closed only upon proper operation of the code bars and a preferred embodiment of such a checking arrangement will be set out in detail below.

It is to be noted in Figs. 4 and 5 that the guide slot 12 at the top of the cards is somewhat off center to the left. A card stop 45 running along the stack is indicated in cross-section. When a card is inserted against the stop, a guide such as 13 of Fig. 1 cannot be seated unless the card is inserted in the correct position. If it is inadvertently placed in backwards, the guide will jam on the edge of that card. Still further assurance against a reversed card may be provided by having holes 43, 44, 53 and 54 so located in the card that if the latter is reversed, their holes will not match with data or block holes of the remainder of the stack so the photo-cell or -cells for the beams through holes 43 and 54 will be intercepted to provide an alarm, as set out above.

Figure 6:
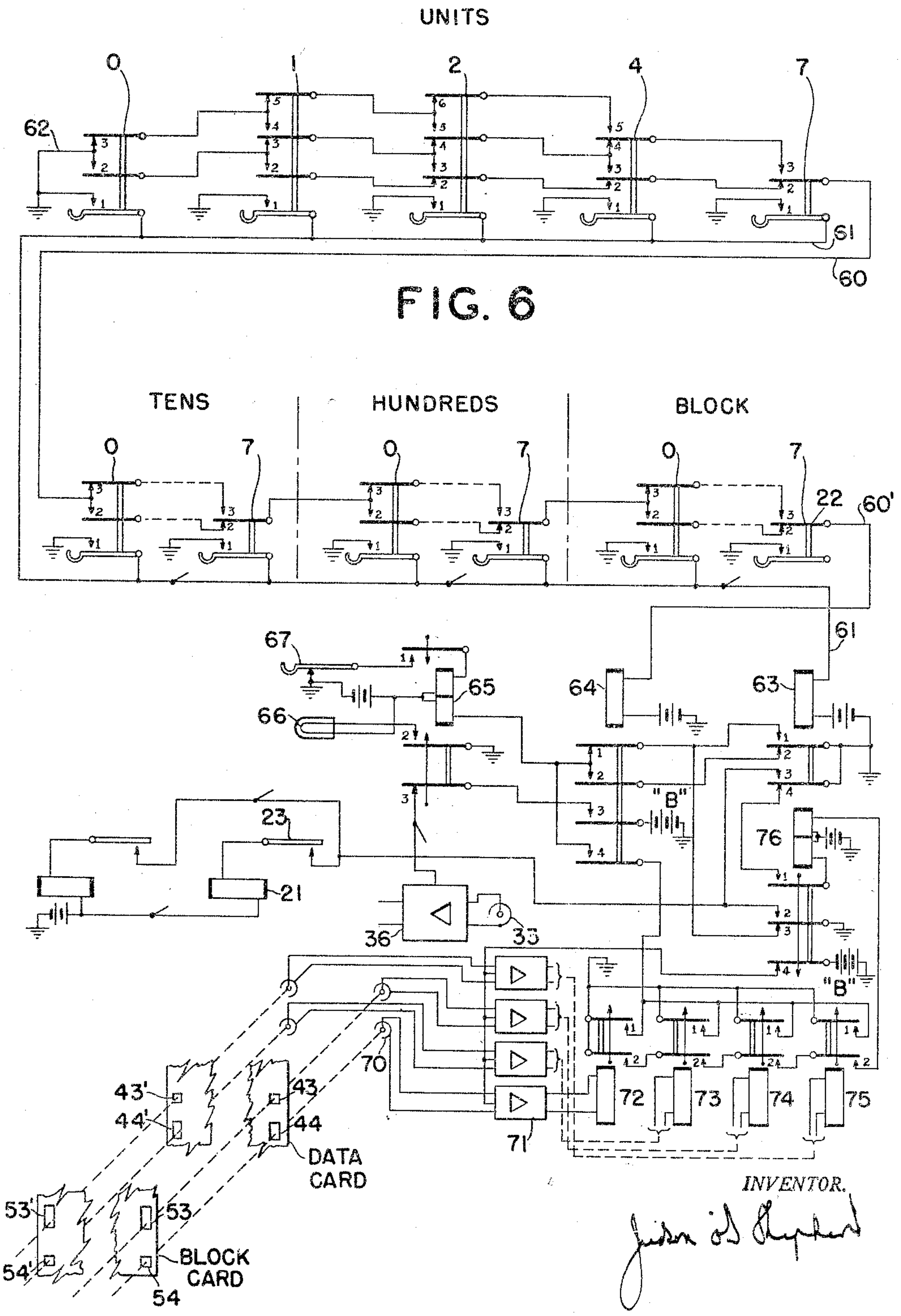
Fig. 6 is a circuit schematic showing checking arrangements to assure that two and only two code bars are operated in each of the several code bar groups, and that the cards are properly displaced for analysis and are properly restored.

Means were outlined above to provide safeguards as to the continued satisfactory operation of the device both as to checking the accuracy of the transfer codes and both the dropping and restoration of the cards, and one arrangement for effecting this is shown by Fig. 6. It will be recalled that the operation of any code bar magnet will also operate a contact assembly such as 22 of Fig. 2 associated with block bar 7. At the top of Fig. 6 are shown in detail the contact assemblies operatively associated with and operated coincidently with the five units code bars, and the circuit interconnections to assure that two and only two code bars are operated for each digit. Upon operation of any code bar, the associated contact springs are moved upward in Fig. 6. The result of actuating any two (and only two) code bars for the units selection is the grounding of conductor 60 extending from upper contacts of units code bar 7. The lower contacts No. 1 of each of the contact assemblies are obviously connected so that the operation of any code bar will ground conductor 61 for purposes to be described.

It will be seen that with the code bars normal, a circuit cannot be traced from ground conductor 62 serially through the upper contacts (those above the No. 1 contacts) of the several contact groups. Let it be assumed that code bars 0 and 1 only for units selection are actuated. This will result in a ground circuit being serially traceable from conductor 62, now closed contact No. 2 of the 0 contact group, now closed contact No. 2 of the 1 contact group, normally closed contacts No. 2 of the 2, 4 and 7 contact groups, to result in conductor 60 being grounded. Had code bar 0 not been actuated together with code bar 1, the above traced circuit would not have been completed due to contacts No. 2 of the 0 group being opened. Under this condition, however, a circuit is partially traceable from ground through normally closed contacts No. 3 of the 0 group, now closed contact No. 4 of the 1 group, and normally closed contact No. 4 of the 2 group, but it will be found open at normally open contacts No. 3 of the 4 group. Another circuit is also partially traceable from conductor 62, normally closed contact No. 3 of the 0 group, now closed contact No. 4 of the 1 group, normally closed contact No. 4 of the 2 group and normally closed contact No. 4 of the 4 group, but this circuit will be found open at normally open contact No. 3 of the 7 group. In a generally similar fashion, had code bars 0 been actuated but 1 had not, a serially traceable ground circuit from conductor 62 will be found open at normally open contact No. 3 of the 7 group.

Now, let it be assumed that due to the occurrence of some trouble, code bar 2 is operated together with bars 0 and 1. The circuit traced above for the extension of ground to conductor 60 will be open at back contact No. 2 of the 2 group of contacts. In similar fashion, it will be found that a ground circuit is traceable from conductor 62 to conductor 60 when two, and only two, code bars are operated, thereby assuring that a code of proper character is received to operate the units code bar magnets. This is the familiar checking arrangement of the "two out of five" transfer code.

In precisely the same fashion, the tens digit, the hundreds digit and the block digit codes and the corresponding operation of the respective code bars are checked. Inasmuch as the contacts and their interconnection may be identical with those described in detail with respect to the units contacts, only the 0 and 7 contact groups are shown for each of the other digits and the interconnection of the intervening 1, 2 and 4 contact groups is represented by dash lines. Taking this contact arrangement as a whole for all digits, it will be seen that conductor 60′ will be grounded when two, and only two, code bar magnets are operated for each digit and the block digit.

The connection of ground to conductor 61 as the result of the operation of any code bar of the device results in the operation of relay 63 over an obvious circuit. Likewise, the grounding of conductor 60′ as a result of the proper operation of code bars for each digit and the block digit will result in the operation of relay 64 over an obvious circuit. It is the purpose of relay 63, upon being operated by any code bar being operated, to establish a circuit to operate alarm relay 65, said circuit being traceable (with relay 64 unoperated) from ground, armature and contact No. 1 of relay 63, armature and No. 1 contact of relay 64, through the lower winding of relay 65 to battery. Relay 65 is slow to operate to give opportunity for relay 64 to operate over the above traced circuit including grounded conductor 60′, as a result of the "two out of five" check. If the circuit functions properly, relay 63 will close the above traced circuit through contact No. 1 as soon as any code bar operates to close its No. 1 contact, and as soon as the "two out of five" check occurs, relay 64 operates to open at its No. 1 contact the circuit to relay 65 to prevent an alarm. Assume that the "two out of five" check is not satisfied and relay 64 does not promptly operate; relay 65 will operate to cause alarm lamp 66 to be lighted. An alarm bell may be connected in multiple with this lamp to provide an audible alarm, if desired. Relay 65 locks operated by a circuit traceable from battery, through the upper winding of relay 65, its armature and contact No. 1, to ground at normally closed key 67. This key may be operated by an attendant to release relay 65, when the trouble has been cleared.

Alarm relay 65 will also be operated and locked up should relay 63 be released by restoration of all code bars, but due to a faulty ground on conductor 61, or other reason, relay 64 does not release at the end of a complete reading function, said circuit being traceable from ground, armature and back contact No. 2 of relay 63, armature and front contact No. 2 of relay 64 through the lower winding of relay 65 to battery.

It may be desirable to provide battery to excite the scanning cells such as 33 only while a reading of the cards is being made. Battery for the photo-cells may be traced from the armature and No. 3 contact of operated relay 64, armature and back contact No. 3 of the alarm relay 65 to the several amplifiers such as 36. It will be seen that excitation is provided for the photo-cells only if the "two out of five" check is completed for all digits and the block cards, and the alarm relay is normal.

Means were also generally set out above whereby the dropping or restoration of cards in both the data and block groups can be checked, and an arrangement is also shown by Fig. 6 for the accomplishment of this further check. It will be recalled that Fig. 4 shows a punching 43 and a slot 44, which are provided in identical locations near the right hand edge of all data cards and a reversed arrangement of a punching 54 and slot 53 provided in identical locations near the right hand edge of all block cards. It is proposed to have similarly located holes near the left hand edge of these cards. Fig. 6 shows the edges of a typical data and a typical block card, with the holes near the left hand edge designated 43′ and 44′ for the data cards and 53′ and 54′ for the block cards. Rays or beams of light from source 29 are indicated as normally passing through the above designated aligned holes. Each of these beams is directed to one of four photo-cells such as 70, each having an amplifier 71 adapted to operate a relay such as 72 when the cell is excited. Excitation battery for the latter mentioned photo-cells is furnished the amplifiers such as 71 from a back contact No. 4 of relay 76. Relay 76 is normally locked operated under control of relay 63 from battery through its lower winding, its armature and contact No. 1 to ground at back contact No. 4 of relay 63. When relay 63 is operated due to any code bar being operated, it releases relay 76 to result in battery being supplied the amplifiers such as 71 and photo-cells such as 70. The operation of relay 63 indicates that with proper functioning of the device a card in the data and in the block group of cards should promptly drop, and should drop squarely, i. e., should not be skewed around as might result from one side of a card sticking or hanging. The dropping of a card in both the data and block groups results in the beams for the photo-cells such as 70 being cut off by holes 43, 43′, 54 and 54′ being displaced. If a card of either group hangs, or it becomes skewed around, one or more beams of light will excite a cell such as 70 to result in the operation of at least one of relays 72–75. The operation of any of these relays will result in the extension of ground from its armature and No. 1 contact, front contact No. 4 of relay 64 (which is now assumed operated from a "two out of five" check) through the lower winding of alarm relay 65 to battery, resulting in the latter relay operating alarm lamp 66, and locking operated.

When all cards are restored to normal, all cells such as 70 are again excited to operate all of relays 72–75. A ground circuit may then be traced serially through the armatures and No. 2 contacts of said operated relays to operate relay 76, which locks to back contact No. 4 of relay 63, as described. Relay 76 is normal during the reading process, so a ground is extended from its armature and back contact No. 3 to the upper armature of relay 64, which is operated during reading. After reading is completed, relay 64 will release, and the latter traced ground circuit is completed to alarm relay 65. But if the cards are properly restored, relay 76 will be promptly operated as a result of excitation of all of cells such as 70. This normally will break the above traced circuits from back contact No. 3 of relay 76, armature and contact No. 1 of relay 64 to the winding of relay 65 before the latter slow-to-operate relay can close its contacts to alarm lamp 66. Relays 72–75 are slow to release so that they will remain operated for a short interval after relay 76 interrupts the excitation circuit at its contact No. 4 for cells such as 70 to assure time for relay 76 to operate and lock operated.

As a further assurance that all cards are in their normal position, and none of them is reversed, the holes in the two sides of the cards may be so located that a reversed card will not permit light to pass through the stack. That is, should a block card, for example, be reversed, punching 54′ will not then be in position to permit the beam of light for cell 70 to pass through that reversed card. This hole location arrangement is also contemplated for the data cards.

Fig. 2 indicates that the control contacts such as 23 for the code bar magnet 21 are closed directly to ground to operate said magnet. With the checking circuit shown by Fig. 6, this ground may be provided through front contact No. 2 of relay 76 for a further check. It will be recalled that this relay is operated and locked up after card restoration has been checked. It will also be recalled that relay 76 is released during reading, thereby opening the ground circuit for contacts such as 23. But continuity of a ground supply for contacts such as 23 is necessary, and this is provided at front contact No. 3 of relay 63, which is operated during reading. Relay 76 is sufficiently slow to release to assure that contact No. 3 of relay 63 is closed before contact No. 2 of relay 76 is open.

While it is contemplated above that the data information for each translation will comprise a row of holes across a card such as shown by Fig. 4, it will be recognized that the holes for each translation may be otherwise located, as by groups for example, in accordance with a predetermined pattern. This will require that the holes in the block cards be designed in accordance with the same pattern.

The principle of employing 64 point cards in conjunction with ten digit cards is particularly applicable to the expansion of metropolitan areas in which the numbering plan is presently of the type AB–XXXX, which is theoretically limited to 64 central offices, into the ABX–XXXX type with a theoretical limit of 640 offices. This requires the addition of an extra register for the extra digit to be used. In accordance with the present invention, the "AB" registers may effect selection of any of 64 data cards and the third digit (the added "X" of the office code) may be employed to select a block card to make effective any of the ten sets of translations of the dropped data card.

The above disclosure indicates a series of data cards in number corresponding to the primary selection together with a series of ten block cards, where decimal arrangements are used. Assuming decimal arrangements, 2-digit translation will require ten data and ten block cards, or a total of twenty, while 3-digit translation will require 100 data and ten block cards, a total of 110, while 4-digit translation, as set out with respect to Figs. 4 and 5, requires 1,010 cards. Where a limited number of translation items of information are needed, 3-digit translation may be accomplished with thirty cards, of which ten data cards may carry all translation data arranged in ten horizontal rows. Such cards may be selected in accordance with the hundreds digit. Each row may, for example, contain 40 data punchings, comprising ten groups of four data holes. The tens digits may be effective to select a first block card similar to that of Fig. 5, which will block out all data punchings except that for a single row of holes of the hundreds digit card which corresponds to said block card. A second block card selectable in accordance with the unit digit will be effective to block all but four data holes in each row. That is, the selection of the hundreds card will present for scanning the translation data for 100 translations comprising 100 groups of four data holes, or a total of 400 such data holes. The tens card will block out all but one row which, at this stage, will leave ten groups of four holes each which are scannable. The units card which is selected will have its blocking holes arranged to unblock a vertical file of ten rows of four holes in each data card. It will be seen, therefore, that the tens and units blocking cards are in cooperative relation, the former selecting a full horizontal row of 40 holes, while the units card selects a vertical file of 40 holes, four in each row. The coordinated operation of a tens and units card will, consequently, result in unblocking a single group of four data holes out of 100 such groups, and the translation information which is passed through these four holes will be dependent upon the punchings in the hundreds card which was selected. While the selections just described have, for simplicity, assumed that the cards will be selected one at a time, the selection of the three cards, one in each group, preferably will be simultaneous. By the means described above, 3-digit translation may be effected with 30 cards. It is contemplated that the data punchings may be for individual items or these punchings may be made in accordance with a code, dependent upon the nature of the desired translation and application of the device. It is to be recognized that, with this embodiment, a lens system may be employed to direct the light from the scanned stack into photo-cells of a number equal to the maximum required for any single translation.

It is to be recognized that the edges of the data and/or block cards may be notched for provision of scannable information.

While selections on a decimal basis have been described, this invention is not so limited.

In some applications of this invention, it may be desirable to place a portion of the data or other information representations on the data card and another portion of it on the block cards. The data cards may, in this embodiment, be provided with block punchings adapted to make effective certain data information on the block card, in the same general fashion as the block cards in the primary embodiment selectively make effective data information on the data cards.

It will be further recognized that in practicing this invention the two (or more) sets of cards may have data, or the like, punchings on cards of various categories in which a desired result may be accomplished by having data punchings in some cards of the several categories with block punchings corresponding thereto in cards of other categories. That is, there is no necessary restriction of cards to the category of "data" or to that of "block," since each may perform a proper share of the joint effect of providing a sensible information result. To illustrate, a first "data" card may be dropped corresponding to a first portion of information to be translated. A "block" card may also be dropped corresponding to a second portion of information to be translated and a second "data" card with blocking punchings may also be dropped to modify or supplement the information provided by dropping the first two cards. The first mentioned "data" card, likewise, may have blocking punchings to cooperate with other "data" cards. The dropping of these various cards may, of course, be simultaneous, and preferably so, although the sensing of the first two cards may be employed to select the third card which is dropped. This is an illustration of the flexibility of this invention and its adaptability to meet the needs of the technician in adapting it to his purpose.

It is common practice in the telephotography art to chop the modulated beam of light so that the photo-cell which receives it will actuate an associated amplifier designed to function from an A. C. signal input to thereby simplify the construction of said amplifier. It is contemplated that this well-known expedient may be applied to the present invention for this same purpose, and the chopping means may be a motor driven, fan-like member mounted between light projector 29 and the stack of cards to chop the light beams. It is further contemplated that the photo-responsive cells such as 33, 34 and 35 may be phototransistors, for such devices are encompassed within the term photo-responsive element.

It is to be understood that various applications and embodiments other than those set out may be made by those skilled in the art without departing from the spirit of the invention as defined within the scope of the appended claims.

What is claimed is:

1. A data translator including a plurality of displaceable sensible information bearing cards, means to selectively displace a number of said cards, and means to jointly sense information borne by said displaced cards.

2. A data translator including a plurality of displaceable cards bearing sensible information designations, means to selectively displace said cards in pairs and means common to all of said cards to sense information corresponding to the selected pair of cards which has been displaced.

3. A data translator including a first set and a second set of displaceable cards, with the cards of each of said sets bearing sensible information, means to selectively displace any individual card of each set and means to jointly sense information borne by the two cards which have been displaced.

4. A data translator including a first set of displaceable cards bearing sensible information designations, a second set of displaceable cards, means to selectively displace a card of each of said sets, and sensing means to sense a portion of the information borne by a displaced card of first said set dependent upon the card of second said set which has been displaced.

5. A data translator including a plurality of sets of displaceable cards, means to selectively displace a card in each of said sets, sensible information designations provided on at least the cards of one of said sets and means common to said plurality of sets of cards to sense information corresponding to the cards which have been displaced.

6. In a data translator, a primary set of displaceable record cards, each bearing sensible information, a secondary set of displaceable cards in alignment with first said set, means to selectively displace a card in each said set, and means responsive to the displacement of a card in each said set to sense a portion of the information on the displaced card of the first said set determined by the card in the second said set which is displaced.

7. A data translator including a set of displaceable cards, each bearing sensible information designations, means to selectively displace any card in said set, means to sense the data of a card of said set which has been displaced, a second set of displaceable cards, means to selectively displace any card in second said set and means responsive to the displacement of a card in second said set to control the sensing of data of a displaced card of first said set.

8. A data translator including a first set of displaceable cards corresponding to a first of a combination of two factors to be translated and with each card of said set bearing sensible translation information corresponding to a particular one of said first factors, a second set of displaceable cards corresponding to a second of said two factors to be translated and with each card of latter said set bearing sensible translation information corresponding to a particular one of said second factors, means to selectively displace a card in each of said sets to designate the two factors to be translated and means to jointly sense the two displaced cards to provide the translation result of the combination of factors represented by said displaced cards.

9. A data translator including two sets of displaceable cards in stacked alignment, holes in said cards arranged to provide aligned holes through said stack of cards, a light projector to project light through the holes in said stack of cards, photo-responsive elements to receive light projected through the aligned holes in said cards and means to selectively displace a card in each set of cards to vary the light received by said photo-responsive elements dependent upon the particular two of said cards which are displaced.

10. A data translator including a plurality of sets of displaceable cards in stacked alignment, aligned holes in all of said cards with certain holes in each of said cards enlarged to represent information designations, a light projector to project light through the aligned holes in said cards, photoresponsive elements to receive light projected through the holes in said cards and means to selectively displace a card in each said set of cards to intercept light transmitted through said enlarged holes of said displaced cards to result in the light received by said photo-responsive elements corresponding to the information designated by conjunction of enlarged holes in the displaced cards.

11. A data translator including an aligned stack of displaceable record cards each of which bears information designations comprising light transmitting openings of a predetermined character therein, a second set of displaceable cards in stacked alignment with first said set with each card of the second said set having predetermined light transmitting openings therein, means to selectively displace any card in each of said sets to align particular openings of said predetermined character in said two displaced cards, a light projector to project light through said aligned predetermined openings of said displaced cards, and photo-responsive elements to receive light projected through said aligned openings.

12. A data translator including a set of displaceable cards in stacked alignment, aligned holes in all of said cards of said set and with certain of the holes in the individual cards of said set enlarged to provide information designations corresponding to each of said individual cards, means to project light through said aligned holes in said set of cards, means to selectively displace any card in said set to cut off the passage of light through said set except through said enlarged holes in said displaced card to result in light passing through said set of cards designating the information carried by said displaced card, a second set of displaceable cards in stacked alignment with the cards of first said set, aligned holes in all of said cards in second said set so that said projected light may normally pass through both sets of cards and with certain of the holes in the individual cards of said second set of cards enlarged, means to selectively displace any card in second said set to cut off the passage of light through last said set of cards except through said enlarged holes in said displaced card of second said set, and light responsive means excited in accordance with the light which passes through the aligned enlarged holes in the two displaced cards.

13. A data translator including a set of displaceable data cards bearing data items for a plurality of informations and a set of control cards individual to the informations, with all of said data and control cards in a single stacked alignment, holes in all of said cards of each set arranged to provide aligned holes through said stack, a projector to project light through the aligned holes of the cards in said stack, predetermined enlargement of certain holes in each said data card to designate data items of a plurality of separate informations, with each said separate information designated in accordance with the location in the card of the holes corresponding to that information, predetermined enlargement of holes in each of said separate control cards corresponding to that control card which may be enlarged to designate data for that information, means to displace individually any data card to cut off the transmission of light through said stack except through the enlarged holes for the data of the several informations of said displaced card, and means to displace a control card to cut off the light for all informations except for that corresponding to said displaced control card as effected by said enlarged holes in latter said card.

14. A data translator in accordance with claim 13, with photo-responsive elements to receive light through the aligned holes in said stack.

15. A data translator in accordance with claim 13, with photo-responsive elements of a number corresponding to the maximum number of data holes which may be enlarged for any information borne by any data card and a lens to direct into said photo-responsive elements the light which is transmitted through said stack of cards.

16. A data translator including a plurality of displaceable cards in stacked alignment, information position defining holes in all of said cards arranged to provide aligned holes through said stack and with certain of said holes in each individual card enlarged in a particular manner to designate information corresponding to that card, a source of light to project light through the aligned holes in said stack of cards, means to displace any card to cut off the light projected through said stack of cards except that projected through the enlarged holes of the displaced card, a plurality of photo-responsive elements in number less than the number of said information position defining holes in any of said cards and a lens to direct into said photo-responsive elements light which is transmitted through said stack of cards.

17. A data translator including a plurality of displaceable data cards in stacked alignment and with each card corresponding to a plurality of translations and with each translation comprising a plurality of data elements, holes in each card defining positions of data elements and so arranged that the holes in the stacked cards are aligned through the stack and further so arranged that corresponding data element holes for the several translations of a card are aligned in the card, predetermined enlargement of certain data defining holes in each card to designate the particular data of the several translations corresponding to that card, means to project light through the aligned data position-defining holes in said stack of cards, means to selectively displace any card of said stack to cut off the light through the stack except for the data of the several translations defined by the enlarged holes in the displaced card; a set of displaceable control cards in stacked alignment with said data cards and with each control card corresponding to one of the translations which may be borne by any data card and with holes in each control card corresponding in position to the data element position defining holes of the data cards so that light may be projected through the holes of the combined stack of cards, predetermined enlargement of those holes in each control card corresponding in position to the data element position defining holes in the data cards of the translation represented by the respective control card, means to selectively displace any control card to cut off the light through the combined stack except for the translation data corresponding to the displaced control card so that the displacement of a control card and a data card will result in the cutting off of light through the combined stack except for the data of the translation corresponding to the displaced control and data cards, photo-responsive elements in number corresponding to the maximum number of data element defining hole positions for any individual translation, and lens means to direct light which is transmitted through said combined stack into said photo-responsive elements.

18. A data translator including a plurality of displaceable sensible information bearing numerically-designated cards, electro-magnetic means operatively associated with said cards to selectively displace a plurality of said cards, circuit connections to operate said electro-magnetic means in accordance with a "two out of five" selecting code corresponding to the numerical designations of each of the cards selected, means to check the "two out of five" code, and means responsive to said checking means checking the "two out of five" code for each selected card to sense information borne by said displaced cards.

19. A data translator including a plurality of displaceable sensible information bearing cards, means to selectively displace a plurality of said cards in a particular manner, testing means to test the displacement of said cards in said particular manner, and means responsive to said testing means to sense the information borne by said displaced cards.

20. A data translator including a plurality of displaceable sensible information bearing cards having a normal position, means to selectively displace a plurality of said cards, means to jointly sense information borne by said displaced cards, means to restore said selected cards to their normal position subsequent to their being sensed, and means to test that all said displaced cards are restored to their normal position to enable other cards to be selectively displaced.

21. A data translator including a first set of displaceable cards arranged in stacked alignment with each card bearing holes arranged in rows and with certain holes enlarged to provide information designations, a second set of displaceable cards in stacked alignment with first said set of cards with each of the cards of second set bearing holes in alignment with the holes in the cards of first said set and with the cards of the second said set each having an enlarged row of holes corresponding to a particular row of holes of first said set, means to project light through the aligned holes of both said sets of cards, photo-responsive elements in number corresponding to the maximum number of holes in any row of first said set of cards, a lens to direct onto said photo-responsive elements light projected through the holes of said cards, and means to selectively displace a card of each said set to cause the information borne by a particular row of holes of the displaced card of first said set to be sensed by the photo-responsive elements, said particular row determined by the enlarged row of holes of the card of said second set which has been displaced.

22. A data translator including a first set of displaceable cards arranged in stacked alignment with each card bearing holes in a predetermined arrangement and with certain holes enlarged to provide a plurality of groups of separate information designations, a second set of displaceable cards in stacked alignment with first said set of cards with each of the cards of second set bearing holes in alignment with the holes in the cards of first said set and with the cards of the second said set each having an enlarged group of holes corresponding to one of the plurality of groups of information designating holes of first said set, means to project light through the aligned holes of both said sets of cards, photo-responsive elements in number corresponding to the maximum number of holes in any one of said plurality of groups of information designating holes of first said set of cards, a lens to direct onto said photo-responsive elements light projected through the holes of said cards, and means to selectively displace a card of each said set to cause the information borne by a particular group of holes of the card of first said set to be sensed by the photo-responsive elements, said particular group determined by the enlarged group of holes of the card of said second set which has been displaced.

23. A data translator including a plurality of of displaceable cards bearing sensible information designations, electro-mechanical means to selectively displace said cards in pairs, and scanning means common to all of said cards to sense information corresponding to the selected pair of cards which has been displaced.

24. In a data translator, a primary set of displaceable record cards, each bearing sensible information, a secondary set of displaceable cards in alignment with first said set, electro-mechanical means to selectively displace a card in each said set, and scanning means responsive to the displacement of a card in each said set to sense a portion of the information on the displaced card of the first said set determined by the card in the second said set which is displaced.

JUDSON O'D. SHEPHERD.

REFERENCES CITED

The following references are of record in the file of this patent:

UNITED STATES PATENTS

| Number | Name | Date |
|---|---|---|
| 2,255,147 | Broido | Sept. 9, 1941 |
| 2,448,830 | Robbins et al. | Sept. 7, 1948 |